United States Patent
Twigg et al.

(10) Patent No.: US 12,003,089 B2
(45) Date of Patent: Jun. 4, 2024

(54) SHORT TO GROUND PROTECTION AND AUTOMATIC RECOVERY

(71) Applicant: Microchip Technology Incorporated, Chandler, AZ (US)

(72) Inventors: Christopher Twigg, Endwell, NY (US); Zbigniew Lata, Plano, TX (US); Fernando Gonzalez, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/517,782

(22) Filed: Nov. 3, 2021

(65) Prior Publication Data

US 2022/0140595 A1   May 5, 2022

Related U.S. Application Data

(60) Provisional application No. 63/110,239, filed on Nov. 5, 2020.

(51) Int. Cl.
| | |
|---|---|
| *H02H 9/00* | (2006.01) |
| *H02H 1/00* | (2006.01) |
| *H02H 3/06* | (2006.01) |
| *H02H 3/08* | (2006.01) |

(52) U.S. Cl.
CPC ............ *H02H 3/08* (2013.01); *H02H 1/0007* (2013.01); *H02H 3/06* (2013.01)

(58) Field of Classification Search
CPC ........... H02H 3/06; H02H 3/08; H02H 1/0007
USPC ......................................................... 361/54
See application file for complete search history.

(56) References Cited

U.S. PATENT DOCUMENTS

| | | | | |
|---|---|---|---|---|
| 4,977,477 | A | 12/1990 | Babico et al. | 361/98 |
| 5,491,601 | A | 2/1996 | Arntz et al. | 361/79 |
| 5,581,433 | A * | 12/1996 | Jordan | H03K 17/0822 361/87 |
| 5,793,596 | A * | 8/1998 | Jordan | H03K 17/0822 361/18 |
| 11,205,894 | B1 * | 12/2021 | Scheel | H02H 7/20 |
| 2010/0007216 | A1 * | 1/2010 | Chojecki | H03K 17/0822 307/115 |
| 2010/0097126 | A1 * | 4/2010 | Yamazaki | H03L 7/0895 327/536 |

FOREIGN PATENT DOCUMENTS

CN   105514932 B   4/2016   ............ H02H 3/06

OTHER PUBLICATIONS

International Search Report and Written Opinion, Application No. PCT/US2021/057975, 12 pages, dated Feb. 28, 2022.

* cited by examiner

*Primary Examiner* — Jared Fureman
*Assistant Examiner* — Lucy M Thomas
(74) *Attorney, Agent, or Firm* — SLAYDEN GRUBERT BEARD PLLC

(57) ABSTRACT

An apparatus includes a single sense pin connected to a line of a device connected to the apparatus, a gate pin configured to produce a gate signal to enable or disable a switch connected between the line of the device connected to the apparatus and a system ground, and control logic. The control logic is configured to at the single sense pin, determine a short between the device and the system ground, and, based upon the determination of the short, disable the switch.

17 Claims, 5 Drawing Sheets

US 12,003,089 B2

SHORT TO GROUND PROTECTION AND AUTOMATIC RECOVERY

RELATED PATENT APPLICATION

This application claims priority to commonly owned U.S. Provisional Patent Application No. 63/110,239 filed Nov. 5, 2020, the entire contents of which are hereby incorporated by reference for all purposes.

FIELD OF THE INVENTION

The present application relates to charging and powering electronic devices and, more particularly, to short to ground protection and automatic recovery.

BACKGROUND

Power shorts between a voltage and ground may arise from a variety of conditions in electronic devices. For example, a universal serial bus (USB) connector may have its ground signal exposed and the ground signal may come in contact with battery or supply lines, accidentally causing an unlimited amount of current to flow to ground. In a further example, an end of a compromised USB cable may fall into the 12 V DC connection for a cigarette lighter in a vehicle. In another example, a USB cable may be crushed, causing a short from its 20V supply line to ground.

Some approaches for providing protection against shorts include using a shunt resistor to measure the voltage or current and, if the voltage or current is too high, shutting off a source of the voltage. However, this approach may require three pins for a detection device, wherein two pins are used for the shunt resistor and one pin is used to drive a switch to turn the source of the voltage on or off. Moreover, these approaches might require particular implementations of the switch, such as field effect transistors (FET) that have specific drain-source resistance values. Examples of the present disclosure may address one or more of these shortcomings by other solutions, and may provide short to ground protection and automatic recovery from a short detection.

SUMMARY

Examples of the present disclosure include an apparatus. The apparatus may be implemented in any suitable manner, such as by a microcontroller, die, or system on a chip. The apparatus may be configured to connect to an external device. In one example, the apparatus may provide a ground line for the external device. The apparatus may be connected to any external device, such as a USB device. The apparatus may be configured to communicate with the external device through a connector. Moreover, the apparatus may be configured to provide a ground connection to a system ground on behalf of the external device.

The apparatus may be connected between a voltage line and the ground line for the external device. The voltage line may be connected to system ground through a switch. The switch may be implemented in any suitable manner, such as by a transistor. The apparatus may be connected to the voltage line through an offset resistor.

The apparatus may be connected to the voltage line, in one example, by a single sense pin. The single sense pin might be used instead of two sense pins across a shunt resistor, as done in other solutions.

The apparatus may include a gate pin. In one example, the gate pin may be configured to produce a gate signal to enable or disable the switch.

In one example, the apparatus may include control logic. The control logic may be implemented by analog circuitry, digital circuitry, instructions for execution by a processor, or any suitable combination thereof. The control logic may be configured to operate the gate pin and to detect voltages on the sense pin. In one example, the control logic may be configured to, at the single sense pin, determine a short between the external device and the system ground. Based upon the determination of the short, the control logic may be configured to disable the switch.

Examples of the present disclosure may include a system. The system may include an apparatus of any of the above examples, as well as the switch. The system may include a connector to the external device.

Examples of the present disclosure may include methods performed by any of the systems or apparatuses of the above examples.

DETAILED DESCRIPTION

Figure 1:
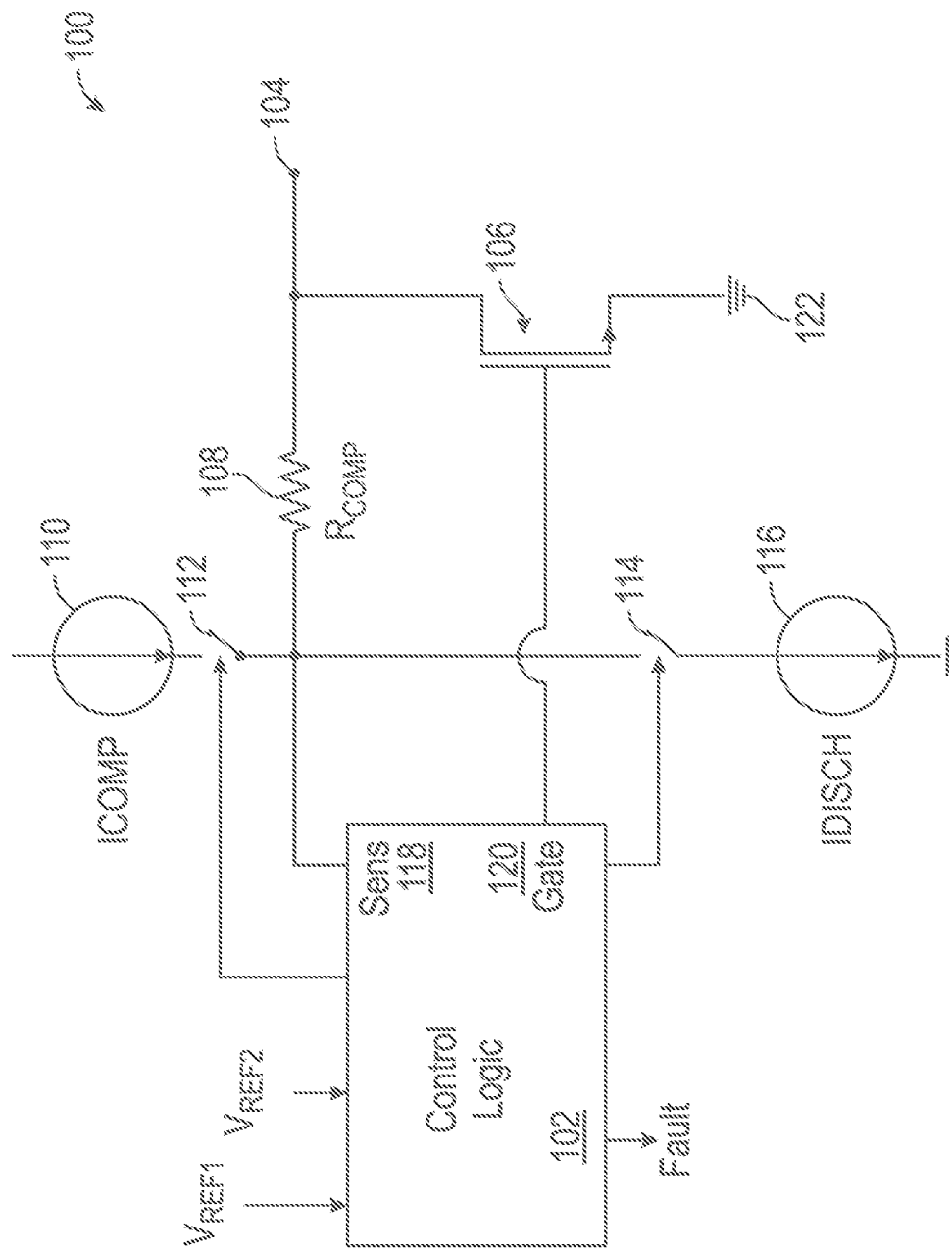
FIG. 1 is an illustration of an example apparatus for short to ground protection and automatic recovery, according to embodiments of the present disclosure.

Embodiments of the present disclosure include an apparatus. The apparatus may be implemented in any suitable manner, such as by a microcontroller, die, or system on a chip. The apparatus may be configured to connect to an external device. In one example, the apparatus may provide a ground line for the external device. The apparatus may be connected to any external device, such as a USB device. The apparatus may be configured to communicate with the external device through a connector. Moreover, the apparatus may be configured to provide a ground connection to a system ground on behalf of the external device.

The apparatus may be connected between a voltage line to the ground line for the external device. The voltage line may be connected to system ground through a switch. The switch may be implemented in any suitable manner, such as by a transistor. The apparatus may be connected to the voltage line through an offset resistor.

The apparatus may be connected to the voltage line, in one example, by a single sense pin. The single sense pin might be used instead of two sense pins across a shunt resistor, as done in other solutions.

The apparatus may include a gate pin. In one example, the gate pin may be configured to produce a gate signal to enable or disable the switch.

In one example, the apparatus may include control logic. The control logic may be implemented by analog circuitry, digital circuitry, instructions for execution by a processor, or any suitable combination thereof. The control logic may be configured to operate the gate pin and to detect voltages on the sense pin. In one example, the control logic may be configured to, at the single sense pin, determine a short between the external device and the system ground. Based upon the determination of the short, the control logic may be configured to disable the switch.

In combination with any of the above examples, the apparatus may include a current source. The current source may be connected to the sense pin. The control logic may be configured to selectively enable or disable the current source. When enabled, the current source may allow detection and measurement of a voltage drop an offset resistor on the line of the device connected to the apparatus, the switch, or a combination of the offset resistor and the switch, the voltage drop configured to indicate the short. The voltage drop may be used to determine whether there is a short from the external device to the system ground on the line. In one example, the control logic may be configured to disable the current source based upon the determination of the short.

In combination with any of the above examples, the apparatus may include a current sink. The current sink may be connected between the sense pin and ground. The control logic may be configured to selectively enable or disable the current sink. In one example, the control logic may be configured to enable the current sink when the short is detected. When enabled, the current sink may facilitate the flow of current from the external device to system ground, but not through the switch, but instead through the current sink.

In combination with any of the above examples, the control logic may be further configured to detect the short through a determination that voltage at the single sense pin is above a first voltage threshold, such as 100 mV.

In combination with any of the above examples, the control logic may be further configured to determine that the short has ended through a determination that voltage at the single sense pin has subsequently fallen below a second threshold, such as 80 mV.

In combination with any of the above examples, the first voltage threshold may be higher than the second voltage threshold.

In combination with any of the above examples, the control logic may be further configured to, based on a determination that voltage at the single sense pin previously exceeded the first voltage threshold, that voltage at the single sense pin is below the first voltage threshold, and that voltage at the single sense pin is above the second voltage threshold, continue to disable the switch.

FIG. 1 is an illustration of an example apparatus for short to ground protection and automatic recovery, according to examples of the present disclosure. The apparatus may be implemented as a short protection circuit (SPC) 100.

SPC 100 may be implemented in any suitable manner, such as by a device, die, chip, analog circuitry, digital circuitry, instructions for execution by a processor, or any combination thereof. SPC 100 may be implemented within any suitable context, such as within a USB port, USB power protection device or circuit, a USB hub, USB charging port, USB host, infotainment or head unit of a vehicle, a communications or power protection circuit for any suitable protocol, or any other suitable electronic device.

SPC 100 may be configured to monitor, condition, or otherwise move signals between two elements. For example, SPC 100 may evaluate signals between a USB controller and a transceiver and a USB connector.

In particular, SPC 100 may be configured to monitor for voltage conditions such as a short to ground, also referred to as a short circuit or simply a short. A short may arise from, for example, a connection of a power source such as a positive terminal of a battery to ground with very little resistance in the connection. This may cause a high current flow, which may in turn cause other side effects such as high temperature, damage to electronic devices or cabling, or fire. SPC 100 may be configured to monitor for shorts on, for example, a line 104. Line 104 may be connected to any suitable source that is to be monitored for shorts.

Line 104 may include any suitable electrical connection to any suitable circuit, electronic device, connector, or other element that may be monitored for an electrical short. Line 104 may implement, for example, a return path, supply line, or bias line from an electronic device. For example, line 104 may be connected to the ground terminal of a USB cable or USB connector (not shown). Line 104 may also be connected to ground of SPC 100. Such a ground of SPC 100 may act as a ground reference for the USB device (not shown) connected across the USB cable or connector. SPC 100 may be configured to monitor for a short arising from, for example, such a ground terminal of a USB cable coming into direct contact with a voltage source (not shown).

SPC 100 may include a sense pin 118 configured to receive input that is to be monitored for a short. Such an input may arise from voltages on line 104. Sense pin 118 may be implemented by any suitable electrical connection.

SPC 100 may include control logic 102. Control logic 102 may be configured to evaluate received signals for a short and to cause any suitable corrective action to be performed. Control logic 102 may be implemented by analog circuitry, digital circuitry, instructions for execution by a processor (not shown), or any suitable combination thereof. In one example, control logic 102 may include sense pin 118. In another example, sense pin 118 may be located outside of control logic 102, such as on the periphery of electronic device packaging in which control logic 102 is implemented.

In order to detect a short, control logic 102 may be configured to evaluate a voltage drop across a switch, such as switch 106.

Switch 106 may be implemented within SPC 100 or may be connected to SPC 100. Switch 106 may be implemented in any suitable manner, such as a transistor, or, more specifically, a field effect transistor (FET), or a power FET. Switch 106 may include a resistance that, for example and when enable, 5 milliohms to 15 milliohms. This may be referred to as an ON resistance. Switch 106 may be arranged or connected between line 104 and ground 122. When activated, switch 106 may connect ground 122 and line 104. This may provide a voltage drop across switch 106, due to the ON resistance of switch 106. When deactivated, switch 106 may disconnect ground 122 and line 104. Switch 106 may thus be configured to provide a voltage drop which may be measured and used to determine a short is occurring, such as when too much current is passing through to or from ground on line 104.

Upon detection of a short, control logic 102 may be configured to perform or cause to perform any suitable corrective action. Such a corrective action may include disabling switch 106 so that a large current does not pass through switch 106. Upon detection that the short has ended, control logic 102 may be configured to again enable switch 106, thus providing automatic recovery after the short has ended. Control logic 102 may thus be configured to respectively disable or enable switch 106 based upon detection or termination, respectively, of a short. Disabling switch 106 may prevent damage arising from the short. Enabling switch 106 may enable normal operation of SPC 100.

Control logic 102 may be configured to enable or disable switch 106 through issuance of a control signal through a gate pin 120 to, for example, a gate of switch 106. In one example, control logic 102 may include gate pin 120. In another example, gate pin 120 may be located outside of control logic 102, such as on the periphery of electronic device packaging in which control logic 102 is implemented. Gate pin 120 may be implemented by any suitable electrical connection.

In one example, SPC 100 may include or be connected to a resistor 108. Resistor 108 may be an offset resistor. In contrast to a shunt resistor, which may dissipate significant amounts of power, resistor 108 may be implemented as a low power resistor. Resistor 108 may be connected between sense pin 118 and line 104. The resistance value of resistor 108 may be given as RCOMP. Resistor 108 may be an offset or compensation resistor in that it offsets or compensates for resistances of switch 106 or of cabling attached to line 104 in a voltage divider circuit for detection of a short.

Control logic 102 may be configured to compare voltage at sense pin 118 against one or more reference voltages, such as VREF1 or VREF2. For example, VREF1 may be 100 mV and VREF2 may be 80 mV. Based on a comparison of the voltage at sense pin 118 against one or both of these reference voltages, control logic 102 may be configured to detect a short or to determine whether the short has ended. Control logic 102 may thus be configured to enable or disable switch 106 in accordance with such detections. For example, if the voltage on sense pin 118 rises above VREF1, then control logic 102 may be configured to detect that a short is occurring on line 104. Control logic 102 may be configured to then disable switch 106. Subsequently, in another example, if the voltage on sense pin 118 falls back below VREF1, control logic 102 may be configured to detect that the short has ended. Control logic 102 may be configured to then enable switch 106. However, in yet another example, control logic 102 may be configured to not detect that the short has ended until the voltage on sense pin 118 falls back below VREF2, which may be lower than VREF1. Control logic 102 may be configured to then enable switch 106. Thus, control logic 102 may apply a hysteresis to enabling and disabling switch 106, such that switch 106, once disabled, is enabled after the condition has sufficiently ended. Repeated enablement and disablement of switch 106 may be reduced.

SPC 100 may include or may be connected to an offset or compensation current source (IOFFSET) 110 and a discharge current sink (IDISCH) 116. IOFFSET 110 may be connected to sense pin 118. IOFFSET 110 may be selectively turned on or off, or may be selectively applied to a connection of sense pin 118. For example, IOFFSET 110 may be selectively enabled by turning on a switch 112, which may be controlled by control logic 102. IDISCH 116 may be also connected to sense pin 118 and to ground. IDISCH 116 may be selectively turned on or off, or may be selectively applied to a connection of sense pin 118. For example, IDISCH 116 may be selectively enabled by turning on a switch 114, which may be controlled by control logic 102.

In one example, control logic 102 may be configured to enable IOFFSET 110 under normal operating conditions, and to disable IOFFSET 110 when a short is detected. Enabling IOFFSET 110 may provide a specified, controlled current that causes a voltage drop across resistor 108 as current flows through resistor 108 and through switch 106 to ground 122. An offset voltage, equivalent to the current of IOFFSET 110 times the resistance of resistor 108, may be created. When a short is detected, IOFFSET 110 may be disabled. Moreover, excessive current that would otherwise flow to ground because of the short may be controlled.

Resistor 108 may be optionally used so as to create sufficient offset to trip, trigger, or otherwise detect the short. For example, a trip point for the short may be a 100 mV value, which may be VREF1. Resistance of switch 106 may be 5 milliohms. Offset current provided by IOFFSET 110 may be 1 microamp. The current at which a short may be assumed to be occurring may be 10 amps. Thus, if no resistor 108 is used, 10 amps flowing through switch 106 may cause a voltage drop of 50 mV. This may be less than the trip point, 100 mV. Thus, resistor 108 may be utilized with, for example, a value of 50 mV so as to cause additional voltage drop sufficient to meet the trip point to determine that a short has happened. Thus, the voltage drop may indicate whether there is a short, and the voltage drop may be caused by resistor 108, switch 106, or a combination of resistor 108 and switch 106.

In another example, control logic 102 may be configured to disable IDISCH 116 under normal operating conditions, and to enable IDISCH 116 when a short is detected. Enabling IDISCH 116 may provide a defined voltage drop across resistor 108 so that recovery from a short may be detected. Disabling IDISCH 116 may otherwise enable voltage at sense pin 118 to reflect a voltage drop across switch 106 arising from the voltage on line 104. Although a current sink may be used to implement IDISCH 116, any suitable manner of discharging current may be used to implement IDISCH 116.

When a short is detected, control logic 102 may be configured to take any suitable corrective action. For example, as discussed above, when a short is detected, control logic 102 may be configured to disable switch 106. Furthermore, as discussed above, when a short is detected, control logic 102 may be configured to disable IOFFSET 110 (by, for example, turning switch 112 off) and enable IDISCH 116 (by, for example, turning switch 114 on). In a further example, control logic 102 may be configured to perform other corrective actions regarding a system in which SPC 100 is implemented. For example, control logic 102 may be configured to issue a FAULT signal that indicates to other parts of a system in which SPC 100 is implemented that a short has been detected. The other parts of such a system may be configured to take any suitable corrective action based upon the FAULT signal. The FAULT signal may be used, for example, to enable or disable other parts of the system such as connections between USB pins of the system and a device connected to the system.

As discussed above, when no fault or short is detected, IDISCH 116 may be disabled, IOFFSET 110 may be enabled, switch 106 may be enabled. Thus, an offset or compensation current may flow through resistor 108 from sense pin 118 to line 104. This may create a voltage divider circuit. Voltage at sense pin 118 may be measured by control logic 102 and compared against VREF1. A logic high or other suitable signal may be issued by control logic 102 through gate pin 120 to switch 106 to enable switch 106. Thus, switch 106 may be on and connecting the line 104 to system ground 122 with a given resistance of the switch's ON resistance.

When a short occurs, which may have occurred in an element connected to line 104 and not shown in FIG. 1 (such as connected to a USB cable or USB device), current into switch 106 and voltage across switch 106 and at sense pin 118 may begin to rise. At a certain point, the voltage at sense pin 118 may reach VREF1. Control logic 102 may make such a detection and take corrective action. Control logic 102 may issue a fault signal, disable IOFFSET 110, enable IDISCH 116, and disable switch 106. Thus, switch 106 may be off and disconnect line 104 and system ground 122.

In one example, when the voltage at sense pin 118 falls below VREF1, control logic 102 may be configured to determine that the short is over. In another example, control logic 102 may determine whether the voltage at sense pin 118 has fallen below VREF2 to determine that the short is over. As discussed above, this may provide a hysteresis to avoid rapidly and alternately enabling and disabling circuit protection, as well as provide further assurances that the short has actually ended. When the short is over, the fault signal may be disabled, IDISCH 116 may be disabled, IOFFSET 110 may be enabled, and switch 106 may be enabled. By taking these actions after the voltage at sense pin 118 falls below the reference voltage, SPC 100 may be configured to perform automatic recovery after the short is no longer detected.

Thus, SPC 100 may be configured to stop the current flow through line 104 in case of a short, thus helping reduce the chances of damage to electronic devices, melted connectors, or potential fire. Moreover, a shunt resistor is not necessary to implement SPC 100. Resistor 108 may be optional, and may be used if the ON resistance of switch 106 is not sufficiently matched to the resistance of, for example, cabling (not shown) connected to line 104. Resistor 108 may have a smaller footprint than a shunt resistor. Moreover, a single sense pin of SPC 100, sense pin 118, might be used to be connected to line 104, rather than other solutions that may use two sense pins. In such other solutions, two pins might be used to connect to a shunt resistor or another resistor to evaluate a voltage drop across the shunt resistor. Thus, SPC 100 might be implemented with a reduced die size.

Figure 2:
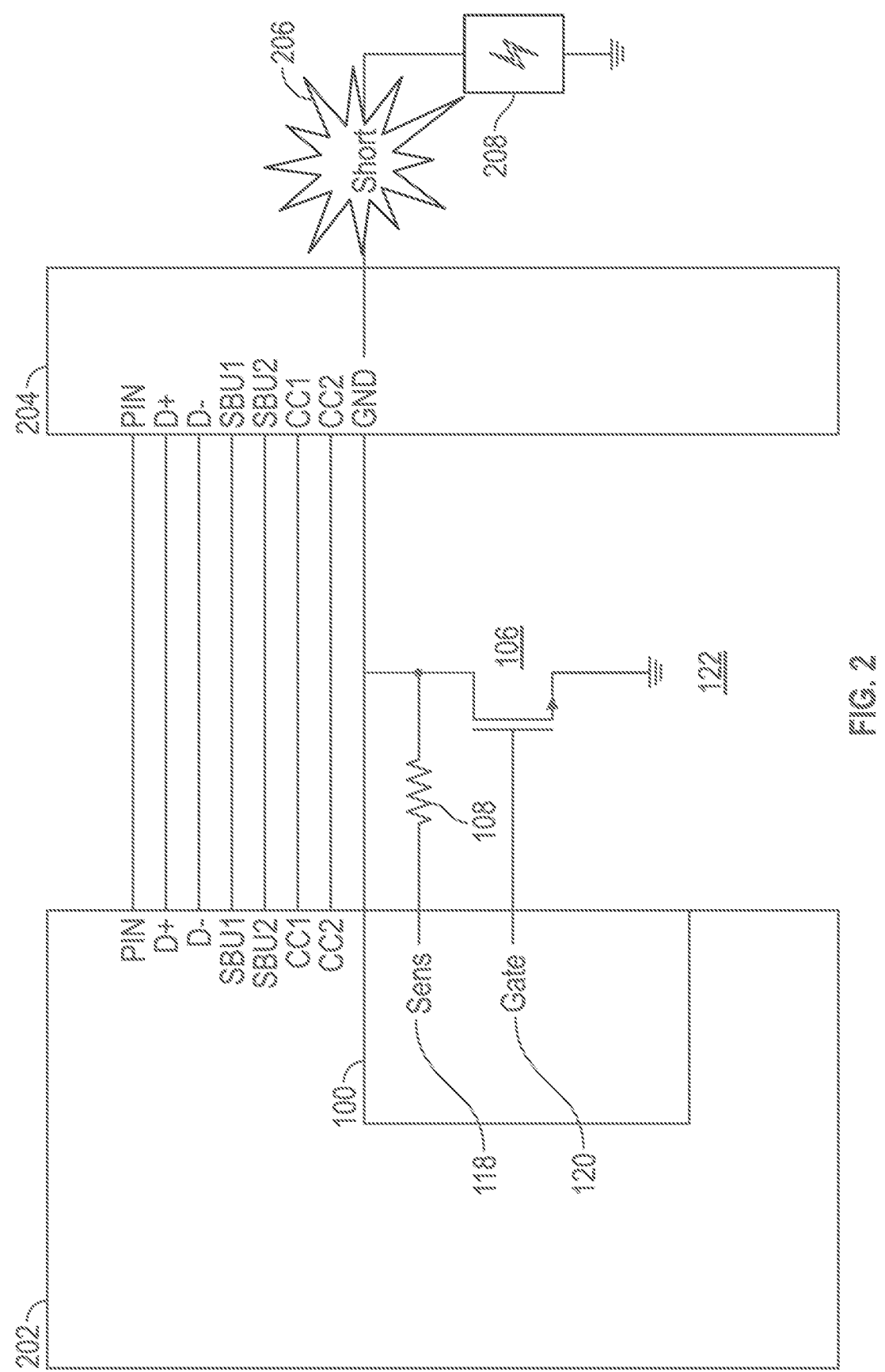
FIG. 2 is an illustration of an example system for use of the apparatus for short to ground protection and automatic recovery, according to embodiments of the present disclosure.

FIG. 2 is an illustration of an example system 200 for use of the apparatus for short to ground protection and automatic recovery, according to examples of the present disclosure. In particular, FIG. 2 illustrates an example use of an instance of SPC 100.

System 200 may include a USB host 202. Although described as a USB host, element 202 may be implemented as, for example, a USB hub, USB bridge, USB charger, head unit of a vehicle infotainment system, or any other suitable electronic device. USB host 202 may be connected to one or more USB elements (not shown) such as USB hosts or devices through a USB connector 204. USB connector 204 may be an interface for, for example, a USB cable (not shown) to such USB elements. USB connector 204 may be implemented in any suitable manner, such as with pins, ports, switch fabric, wires, traces, or any other suitable electrical connections. In the example of FIG. 2, USB-C connections may be used, though SPC 100 may be used in any suitable short detection context, or any suitable connection or communication protocol. Thus, as a USB-C connection, USB host 202 and USB connector 204 may have connections for D+, D−, SBU1, SUB2, CC1, CC2, and ground are shown. In various examples, one or more other connections, represented by PIN on each of USB host 202 and USB connector 204, may be present. For example, power may be provided to a USB device (not shown) connected to USB host 202 through USB connector 204 over the PIN line. The example pinout shown in FIG. 2 is not limiting, as any suitable pinout might be used and SPC 100 may be configured to detect a short on a suitable line between the connected elements.

In the example of FIG. 2, SPC 100 may be implemented within USB host 202. Sense pin 118 of SPC 100 may be connected to the ground pin of USB connector 204. The connection may be made through resistor 108. In the example of FIG. 2, switch 106 and resistor 108 may be implemented outside of SPC 100. Resistor 108 may be connected between sense pin 118 and the ground pin of USB connector 204. Switch 106 may be connected between the ground pin of USB connector 204 and a system ground. Gate pin 120 of SPC 100 might not correspond to any pins otherwise used by USB-C connections. USB host 202 may act as the ground for a USB device (not shown) connected to USB host 202 through USB connector 204.

A short 206 may arise from anywhere within USB connector 204, within any cabling connected to USB connector 204, or within any USB elements connected to USB connector 204. For example, a short may from a positive terminal of battery 208 contacting a connection of the ground pin of USB connector 204. This may cause excessive current to flow to switch 106. SPC 100 may be configured to detect such a short, take corrective action, and maintain the corrective action until the short ends.

Figure 3:
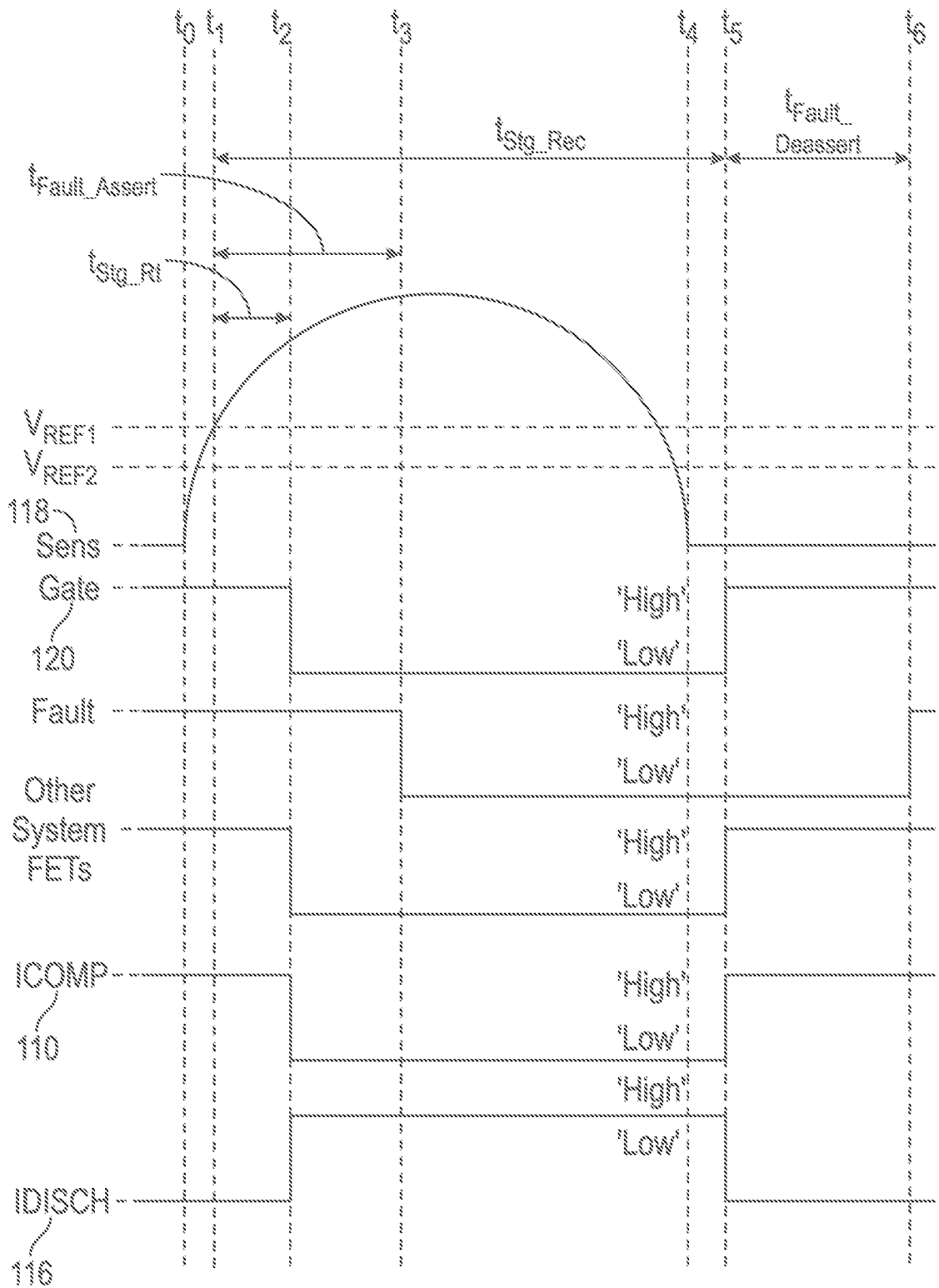
FIG. 3 is a timing diagram of operation of an apparatus for short to ground protection and automatic recovery, according to embodiments of the present disclosure.

FIG. 3 is a timing diagram of operation of an apparatus for short to ground protection and automatic recovery, according to examples of the present disclosure, including when a short is detected but the short is rectified relatively quickly. FIG. 3 may illustrate operation of SPC 100.

Before t0, the voltage detected at sense pin 118 might be stable and below a threshold such as VREF1. At t0, a short may occur, and may cause more current to flow through switch 106 and cause a rise in voltage at sense pin 118.

At t1, the voltage at sense pin 118 may reach or exceed VREF1. The short may be detected by SPC 100.

At t2, SPC 100 may issue a low signal on gate pin 120 to disable switch 106. The delay between t1 and t2 may be given as tSTG_RT. tSTG_RT may reflect an amount of reaction time for processing of SPC 100 to issue the low signal on gate pin 120 and to take other corrective action. This reaction time may be, for example, 500 nanoseconds. Such other corrective action may include, for example, turning off other switches (not shown in FIGS. 1-2) to enable transmission of signals such as across the D+/−, CCx, or SBUx lines. As shown in FIG. 3, FETs for these other system components may also be disabled by issuing a logic low signal. Moreover, IOFFSET 110 may be disabled with a logic low signal. In addition, IDISCH 116 may be enabled with a logic high signal.

At t3, a signal indicating fault, such as a logic low on an inverse of fault signal, may be issued. The time between t1 and t3 may reflect the time to assert a fault from SPC 100 to the rest of the system.

At t4, the voltage on sense pin 118 may fall below VREF2, indicating that the short has ended.

At t5, switch 106 may be reenabled by a logic high signal on gate pin 120, other FETs may be reenabled, IOFFSET 110 may be reenabled by a logic high signal, and IDISCH may be disabled by a logic low level. The additional time after t4 to reach t5 to perform such actions may be due to a length of time given by tSTG_REC, which may reflect a minimum amount of time that the system in which SPC 100 is implemented will take to recover from an identification of a short. This may be, for example, 20 milliseconds. Thus, even though voltage at sense pin 118 fell below VREF2 at t4, SPC 100 may nevertheless wait until the end of tSTG_REC at t5 to reenable switch 106 and otherwise reverse corrective actions taken.

At t6, the fault signal may be cleared by issuing a logic high signal on the inverted fault output after another delay, given by tFAULT_DEASSERT.

Figure 4:
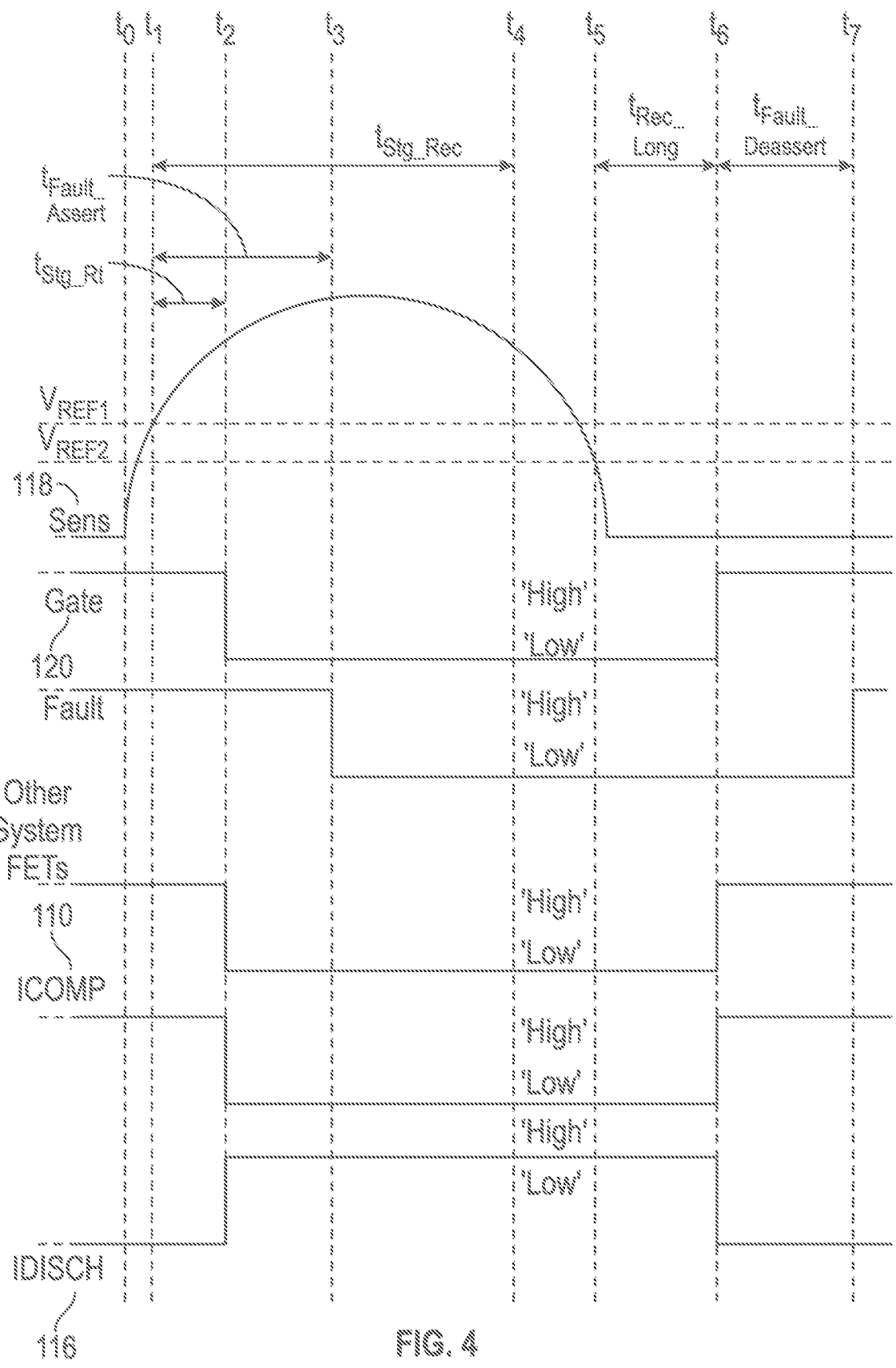
FIG. 4 is a further timing diagram of operation of an apparatus for short to ground protection and automatic recovery, according to embodiments of the present disclosure, including when a short to ground is detected but the short to ground is not rectified relatively quickly.

FIG. 4 is a further timing diagram of operation of an apparatus for short to ground protection and automatic recovery, according to examples of the present disclosure, including when a short is detected but the short is not rectified relatively quickly. FIG. 4 may illustrate operation of SPC 100.

As was shown in FIG. 3, before t0, the voltage detected at sense pin 118 might be stable and below a threshold such as VREF1. At t0, a short may occur, and may cause more current to flow through switch 106 and cause a rise in voltage at sense pin 118.

As was shown in FIG. 3, at t1, the voltage at sense pin 118 may reach or exceed VREF1. The short may be detected by SPC 100.

As was shown in FIG. 3, at t2, SPC 100 may issue a low signal on gate pin 120 to disable switch 106. The delay between t1 and t2 may be given as tSTG_RT. tSTG_RT may reflect an amount of reaction time for processing of SPC 100 to issue the low signal on gate pin 120 and to take other corrective action. This reaction time may be, for example, 500 nanoseconds. Such other corrective action may include, for example, turning off other switches (not shown in FIGS. 1-2) to enable transmission of signals such as across the D+/−, CCx, or SBUx lines. As shown in FIG. 3, FETs for these other system components may also be disabled by issuing a logic low signal. Moreover, IOFFSET 110 may be disabled with a logic low signal. In addition, IDISCH 116 may be enabled with a logic high signal.

As was shown in FIG. 3, at t3, a signal indicating fault, such as a logic low on an inverse of fault signal, may be issued. The time between t1 and t3 may reflect the time to assert a fault from SPC 100 to the rest of the system.

In contrast to FIG. 3, at t4, the length of time given by tSTG_REC may expire without first detecting that the short has ended. Compared to FIG. 3, the value of tSTG_REC in FIG. 4 may be shorter, or the length of time that the voltage at sense pin 118 is above VREF1 or VREF2 may be longer, indicating that the short has endured for a longer amount of time. As discussed above, the length of time given by tSTG_REC may reflect a minimum amount of time that the system in which SPC 100 is implemented will take to recover from an identification of a short.

At t5, the voltage on sense pin 118 may fall below VREF2, indicating that the short has ended. SPC 100 may be configured to enter a recovery period. The recovery period may delay reversal of the corrective action previously taken. The length of time given by the recovery period may be given by tREC_LONG. This may be, for example, 10 milliseconds. This recovery time may allow various portions of a system in which SPC 100 is implemented to recover. Moreover, given the duration of the short, waiting an additional time to reverse the corrective action that was taken may provide additional protection against a reoccurring short.

At t6, the recovery period given by tREC_LONG may expire. As was shown in FIG. 3 at t5 therein, switch 106 may be reenabled by a logic high signal on gate pin 120, other FETs may be reenabled, IOFFSET 110 may be reenabled by a logic high signal, and IDISCH may be disabled by a logic low level.

At t7, as was shown in FIG. 3 at t6 therein, the fault signal may be cleared by issuing a logic high signal on the inverted fault output after another delay, given by tFAULT_DEASSERT.

Figure 5:
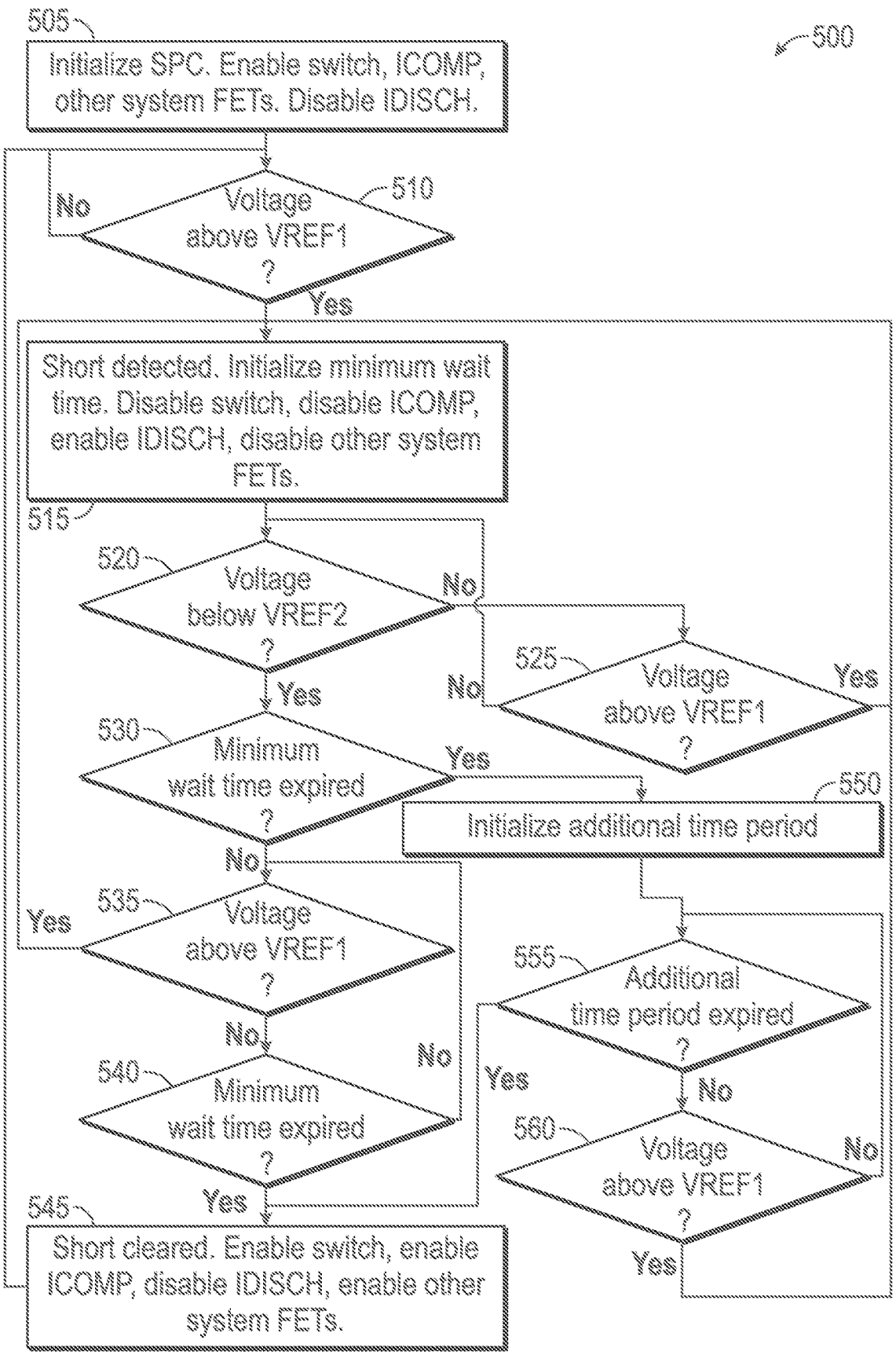
FIG. 5 is an illustration of an example method for short detection and protection, according to embodiments of the present disclosure.

FIG. 5 is an illustration of an example method 500 for short detection and protection, according to examples of the present disclosure. Method 500 may be implemented by any suitable elements, such as by SPC 100. Method 500 may illustrate blocks for operation of SPC 100 according to the timing diagrams of FIGS. 3 and 4. Method 500 may include more or fewer elements than are shown in FIG. 5. Method 500 may begin at any suitable block, such as block 500. The blocks of method 500 may be performed in any suitable order. More or fewer blocks may be used to implement method 500. Moreover, various blocks of method 500 may be repeated, omitted, or performed recursively. Multiple instances of method 500 may be performed in parallel with one another or performed recursively with respect to one another. Method 500 may be selectively performed. In addition, method 500 may be optionally repeated, fully or in part.

At block 505, the SPC may be initialized. This may include enabling the switch (such as switch 106), enabling the IOFFSET source, and enabling any other system FETs. Moreover, this may include disabling the IDISCH sink.

At block 510, voltage at a sense pin may be measured and evaluated. It may be determined whether the voltage is above a first voltage threshold, such as VREF1. If so, method 500 may proceed to block 515. This detection of the voltage being above VREF1 may correspond to, for example, the operation of SPC 100 in the timing diagram of FIG. 3 at time t1 or the timing diagram of FIG. 4 at time t1. Otherwise, method 500 may return to block 510. This block of measuring voltage at the sense pin and, if it exceeds VREF1, proceeding to block 515, may also be performed at any other suitable time during the execution of method 500. For example, block 510 may also be performed in conjunction with blocks 525, 540, or 550.

At block 515, a short may be detected. Wait times for subsequent blocks, such as a minimum wait time, may be initialized. The switch, IOFFSET source, and other system FETs may be disabled. The IDISCH sink may be enabled.

At block 520, it may be determined whether or not voltage at the sense pin has dropped below a second voltage threshold, such as VREF2. In one example, VREF2 may be below VREF1. In another example, VREF1 and VREF2 may be the same value. If voltage at the sense pin has not dropped below VREF2, method 500 may proceed to block 525. If voltage at the sense pin has dropped below VREF2, method 500 may proceed to block 530. This detection of the voltage at the sense pin dropping below VREF2 may correspond, for example, to the operation of SPC 100 in the timing diagram of FIG. 3 at time t4, or to the timing diagram of FIG. 4 at time t5.

At block 525, it may be determined whether voltage at the sense pin is above VREF1. If so, method 500 may return to block 515, wherein the short may continue to be detected, as well as handled as-if the short had just occurred. Otherwise, method 500 may return to block 520.

At block 530, it may be determined whether a minimum wait time has expired. If the minimum wait time has expired, method 500 may proceed to block 550. Otherwise, if the minimum wait time has not expired, method 500 may proceed to block 535. In cases where the minimum wait time has expired—after the voltage at the sense pin dropped below VREF 2 as determined in block 520—the operation may correspond, for example, to the operation of SPC 100 shown in the timing diagram of FIG. 4 at time t5. In cases where the minimum wait time has not expired—after the voltage at the sense pin dropped below VREF 2—the operation may correspond, for example, to the operation of SPC 100 shown in the timing diagram of FIG. 3 at time t4.

At block 535, it may be determined whether voltage at the sense pin is above VREF1. If so, method 500 may return to block 515, wherein the short may be detected again, as well as handled as-if the short had just occurred. Otherwise, method 500 may proceed to block 540.

At block 540, it may be determined whether the minimum wait time has expired. If not, method 500 may return to block 535. If so, method 500 may proceed to block 545. The determination that the minimum wait time has now expired may correspond to, for example, operation of SPC 100 in FIG. 3 at time t5.

At block 545, the short may be cleared. The switch, IOFFSET source, and other system FETs may be enabled. The IDISCH sink may be disabled. Method 500 may return to block 510.

At block 550, an additional time period may be initialized.

At block 555 it may be determined whether the additional time period has expired. If so, method 500 may proceed to block 545. The determination that the additional time period has expired may correspond to, for example, operation of SPC 100 in FIG. 4 at time t6. Otherwise, method 500 may proceed to block 560.

At block 560, it may be determined whether voltage at the sense pin is above VREF1. If so, method 500 may return to block 515, wherein the short may be detected again, as well as handled as-if the short had just occurred. Otherwise, method 500 may return to block 555.

Although examples have been described above, other variations and examples may be made from this disclosure without departing from the spirit and scope of these examples.

We claim:

1. An apparatus, comprising:
    a single sense pin connected to a line of a device connected to the apparatus;
    a gate pin to produce a gate signal to enable or disable a switch connected between the line of the device connected to the apparatus and a system ground; and
    a control logic to:
        enable a current source applied to the single sense pin to apply a first current to be received at the sense pin, the first current to cause a voltage drop across an offset resistor external to the apparatus on the line of the device connected to the apparatus, the switch, or a combination of the offset resistor and the switch, the voltage drop to indicate a short circuit when a magnitude of the voltage drop is above a threshold;
        at the single sense pin, determine the short circuit between the device and the system ground; and
        based upon the determination of the short, disable the switch.

2. The apparatus of claim 1, wherein the control logic is to enable a current sink to apply a second current to the single sense pin to measure voltage from the line.

3. The apparatus of claim 1, wherein the control logic is to disable the current source based upon the determination of the short circuit.

4. The apparatus of claim 1, wherein the control logic is to determine the short circuit between the device and the system ground at the single sense pin through a determination that voltage at the single sense pin is above a first voltage threshold.

5. The apparatus of claim 4, wherein the control logic is to determine that the short circuit has ended through a determination that voltage at the single sense pin has subsequently fallen below a second voltage threshold.

6. The apparatus of claim 5, wherein the first voltage threshold is higher than the second voltage threshold.

7. The apparatus of claim 4, wherein the control logic is to, based on a determination that voltage at the single sense pin previously exceeded the first voltage threshold, that voltage at the single sense pin is below the first voltage threshold, and that voltage at the single sense pin is above a second voltage threshold, continue to disable the switch.

8. A method, comprising:
    at a gate pin, producing a gate signal to enable or disable a switch connected between a line of a device and a system ground;
    enabling a current source applied to a single sense pin connected to a line of the device to apply a first current to be received at the single sense pin, the first current to cause a voltage drop across an offset resistor external to the apparatus on the line of the device, the switch, or a combination of the offset resistor and the switch, the voltage drop to indicate a short circuit when a magnitude of the voltage drop is above a threshold;
    at the single sense pin, determining the short circuit between the device and the system ground;
    based on a determination of the short circuit between the device and the system ground, disabling the switch.

9. The method of claim 8, comprising enabling a current sink to measure voltage from the line.

10. The method of claim 8, comprising disabling the current source based upon the determination of the short circuit.

11. The method of claim 8, wherein the method comprises determining the short circuit between the device and the system ground at the single sense pin through a determination that voltage at the single sense pin is above a first voltage threshold.

12. The method of claim 11, comprising determining that the short circuit has ended through a determination that voltage at the single sense pin has subsequently fallen below a second voltage threshold.

13. The method of claim 12, wherein the first voltage threshold is higher than the second voltage threshold.

14. The method of claim 11, comprising, based on a determination that voltage at the single sense pin previously exceeded the first voltage threshold, that voltage at the single sense pin is below the first voltage threshold, and that voltage at the single sense pin is above a second voltage threshold, continue to disable the switch.

15. A system, comprising:
    a single sense pin connected to a line, the line to connect the system and a connector to an external device;
    a switch coupled between the line and system ground;
    a gate pin to produce a gate signal to enable or disable the switch connected between the line of the external device connected to the apparatus and a system ground; and a control logic to:
- enable a current source applied to the single sense pin to apply a first current to be received at the single sense pin, the first current to cause a voltage drop across an offset resistor external to the apparatus on the line of the external device connected to the apparatus, the switch, or a combination of the offset resistor and the switch, the voltage drop to indicate a short circuit when a magnitude of the voltage drop is above a threshold;
- at the single sense pin, determine the short circuit between the external device and the system ground; and
- based upon the determination of the short, disable the switch.

16. The system of claim 15, wherein the control logic is to enable a current sink to measure voltage from the line.

17. The system of claim 15, wherein the control logic is to disable the current source based upon the determination of the short circuit.

* * * * *